(12) United States Patent
Tsukano

(10) Patent No.: US 10,542,190 B2
(45) Date of Patent: Jan. 21, 2020

(54) COLOR ADJUSTER AND PROGRAM

(71) Applicant: Konica Minolta, Inc., Chiyoda-ku, Tokyo (JP)

(72) Inventor: Toshiki Tsukano, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/113,418

(22) Filed: Aug. 27, 2018

(65) Prior Publication Data
US 2019/0082080 A1    Mar. 14, 2019

(30) Foreign Application Priority Data
Sep. 13, 2017   (JP) ................. 2017-175413

(51) Int. Cl.
*H04N 1/62*    (2006.01)
*H04N 1/00*    (2006.01)

(52) U.S. Cl.
CPC .......... *H04N 1/62* (2013.01); *H04N 1/00411* (2013.01); *H04N 1/00832* (2013.01)

(58) Field of Classification Search
CPC ..................................... H04N 1/62
USPC ..................................... 358/518
See application file for complete search history.

(56) References Cited

U.S. PATENT DOCUMENTS

| | | | | |
|---|---|---|---|---|
| 7,420,706 B2* | 9/2008 | Tin | ....................... | H04N 1/6016 358/1.9 |
| 2002/0145744 A1* | 10/2002 | Kumada | ................ | H04N 1/603 358/1.9 |
| 2008/0144954 A1* | 6/2008 | Chien | ..................... | H04N 1/62 382/254 |

FOREIGN PATENT DOCUMENTS

JP       10-285414      10/1998

* cited by examiner

*Primary Examiner* — Jacky X Zheng
(74) *Attorney, Agent, or Firm* — BakerHostetler

(57) ABSTRACT

A color adjuster includes: a color specifier that specifies a color when an image former forms an image; a pre-modified candidate acquirer that obtains a calculated value to which a profile for forming an image is applied or a colorimetric value of an image forming result with respect to the color specified by the color specifier; a modification history database that stores the calculated value or the colorimetric value obtained by the pre-modified candidate acquirer, the calculated value and the colorimetric value being associated with a past modified value; a modified value determinator that determines a modified value of the calculated value or the colorimetric value obtained by the pre-modified candidate acquirer on the basis of the past modified value stored in the modification history database; and a modified value outputter that displays or outputs the modified value determined by the modified value determinator.

8 Claims, 13 Drawing Sheets

COLOR ADJUSTER AND PROGRAM

The entire disclosure of Japanese patent Application No. 2017-175413, filed on Sep. 13, 2017, is incorporated herein by reference in its entirety.

BACKGROUND

Technological Field

The present invention relates to a color adjuster that controls a color adjustment at the time of forming an image on a paper sheet or the like, and a program that executes the color adjustment.

Description of the Related Art

In the conventional color adjustment at the time of printing a color image on a paper sheet using an image former, first, a user performs an adjustment to have a proper color on a monitor screen of a computer device for color adjustment. Then, after the operation for adjusting the color to the proper color on the monitor screen, a test printing is performed by an image former using the adjusted image data, and the user directly checks the test printed image. The adjustment and the test printing are repeated as necessary to obtain the image of the target color.

FIG. 13 is a diagram illustrating an outline of a conventional color adjustment to a specified color. First, a color is specified by a user operation on a computer device (PC) configured as a color adjuster (step S81), and the computer device obtains each component value of CMYK (cyan, magenta, yellow, and black) with respect to the specified color (step S82). Each component value of CMYK is converted into, by a printer profile installed in the computer device, a component value of CMYK conforming to performance of a printer (image former) that performs printing. Further, the value is converted into a value conforming to a standard by a target profile installed in the computer device, and each component value of CMYK to which the profile is applied is obtained (step S83).

Each component value of CMYK obtained in step S83 is manually modified with respect to colors by a user operation (step S84), and each component value of CMYK modified by the user operation is obtained (step S85). Then, the modified color is displayed on a monitor screen on the computer device (step S86).

FIG. 14 is a flowchart illustrating a procedure of a color adjustment process of performing a test printing by a user operation.

First, the user prints an image (step S91). Here, the image data used for printing is, for example, data modified on the monitor screen on the computer device according to the flow illustrated in FIG. 13. The user visually checks the image printed in step S91 (step S92). Here, when there is a color to be modified within the checked image, the user specifies the color to be modified on the monitor screen on the computer device (step S93).

On the monitor screen, an ideal value of a case where a profile (printer profile and target profile) is applied to the color specified in step S93 is displayed (step S94). Here, the user manually adjusts the specified color using the computer device (step S95), and prints the manually adjusted image (step S96). The user visually checks the image printed in step S96 (step S97), and the user himself/herself determines whether the adjustment result is satisfactory (step S98). When the adjustment result is satisfactory (Yes in step S98), each component value of CMYK adjusted in step S95 is fixed as a modified value (step S99). When the adjustment result is determined not to be satisfactory in step S98 (No in step S98), the process returns to the manual adjustment processing in step S95.

In this manner, the color adjustment at the time of printing is executed while the user is performing the visual check.

JP H10-285414 A discloses a method for adjusting a color in which a user can easily adjust a color of image data to a desired color. According to the technique disclosed in JP H10-285414 A, a difference of an image characteristic is detected by a user operation from a color difference of the image data based on a change in color, a change in brightness, a change in sharpness, and a change of a specified color at a specific portion, and a correction amount is calculated. Then, data in a color conversion table is corrected on the basis of the correction amount.

According to the technique disclosed in JP H10-285414 A, a color of a portion of the image data specified by the user can be easily adjusted by a slider adjustment and the like. While various techniques for simplifying color adjustment have been developed in the past, a final check is performed in such a manner that a user visually checks a printed result of a test printing. Eventually, as illustrated in the flowchart in FIG. 14, printing and adjustment have been repeatedly performed a plurality of times. Accordingly, there may have been a problem that the conventional color adjustment requires a high skill and time-consuming.

SUMMARY

An object of the present invention is to provide a color adjuster capable of easily performing color adjustment without requiring a high skill, and a program that executes the color adjustment.

To achieve the abovementioned object, according to an aspect of the present invention, a color adjuster reflecting one aspect of the present invention comprises: a color specifier that specifies a color when an image former forms an image; a pre-modified candidate acquirer that obtains a calculated value to which a profile for forming an image is applied or a colorimetric value of an image forming result with respect to the color specified by the color specifier; a modification history database that stores the calculated value or the colorimetric value obtained by the pre-modified candidate acquirer, the calculated value and the colorimetric value being associated with a past modified value; a modified value determinator that determines a modified value of the calculated value or the colorimetric value obtained by the pre-modified candidate acquirer on the basis of the past modified value stored in the modification history database; and a modified value outputter that displays or outputs the modified value determined by the modified value determinator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

1. Configuration Common to Each Embodiment

First, a system configuration common to each embodiment will be described. Respective embodiments have configurations illustrated in the examples in FIG. 1, FIG. 2, or FIG. 3.

Figure 1:
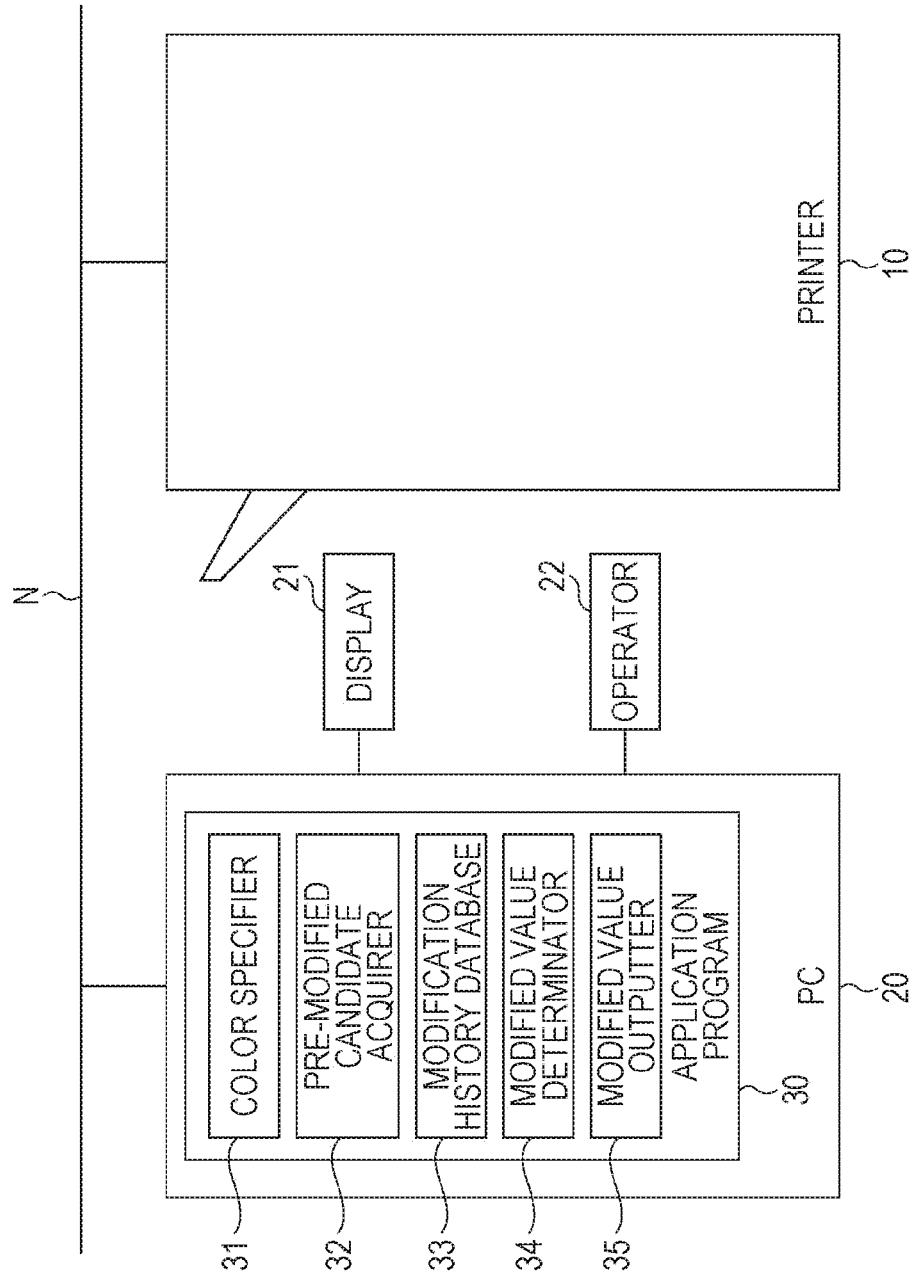
FIG. 1 is a configuration diagram illustrating a system configuration example (Example 1) common to each embodiment of the present invention.

The example illustrated in FIG. 1 is an image forming system including a printer 10 and a computer device (PC) 20. The printer 10 and the computer device 20 are connected in such a manner that data can be transferred through a predetermined network N.

The printer 10 performs printing processing on a paper sheet or the like using image data supplied from the computer device 20. The printer 10 performs processing for forming a color image.

The computer device 20 includes a storage part and an arithmetic processing part (both not illustrated), and functions as a color adjuster in which the arithmetic processing part executes an application program 30 stored in the storage part so that a color adjustment of an image to be printed by the printer 10 is controlled. The application program 30 may be executed by accessing a specific server on a browser instead of the computer device 20.

By executing the application program 30, the computer device 20 can implement functions as a color specifier 31, a pre-modified candidate acquirer 32, a modification history database 33, a modified value determinator 34, and a modified value outputter 35.

The color specifier 31 executes a color specifying procedure. The pre-modified candidate acquirer 32 executes a pre-modified candidate acquisition procedure in which a printer profile determined by a model of the printer 10 and a target profile determined by a standard are applied to data of the specified color, thereby obtaining a calculated value as a pre-modified candidate. Alternatively, the pre-modified candidate acquirer 32 obtains a colorimetric value obtained by reading an actual printed image as a pre-modified candidate. The modification history database 33 stores a modification history indicating a correspondence between a past calculated value and a modified value.

The modification history database 33 is a database that accumulates past histories of the modified value obtained by modifying the calculated value and the colorimetric value by a user operation.

The modified value determinator 34 executes, on the data of the color obtained in the pre-modified candidate acquisition procedure, a modified value determination procedure for determining a modified value deemed appropriate using data in the modification history database 33. When the modified value determinator 34 determines the modified value deemed appropriate using the modification history database, the modified value deemed appropriate is determined using one or a plurality of past histories in which a past color component value is modified.

For example, when a plurality of histories is used, a decision tree (prediction model) is obtained from among a plurality of modification histories by applying a machine learning algorithm called a random forest. Then, the modified value deemed appropriate is obtained from the calculated value (or colorimetric value) by applying the obtained decision tree. Alternatively, a relationship between the calculated value (or colorimetric value) and the modified value stored in the modification history database is estimated using a method such as a regression analysis, and the modified value is obtained on the basis of the estimation. Further, when there is only one calculated value (or colorimetric value) and the modified value that can be referred to, which is stored in the modification history database, the modified value that has been referred to is set directly as a modified value.

The modified value outputter 35 executes a modified value output procedure for outputting the modified value determined by the modified value determinator 34.

The computer device 20 includes a display 21 and an operator 22. Information regarding color specification is displayed on the display 21. The operator 22 performs the color specification, the color adjustment, and the like by a user operation. The operator 22 can also provide an instruction on an operation such as printing using the printer 10.

Figure 2:
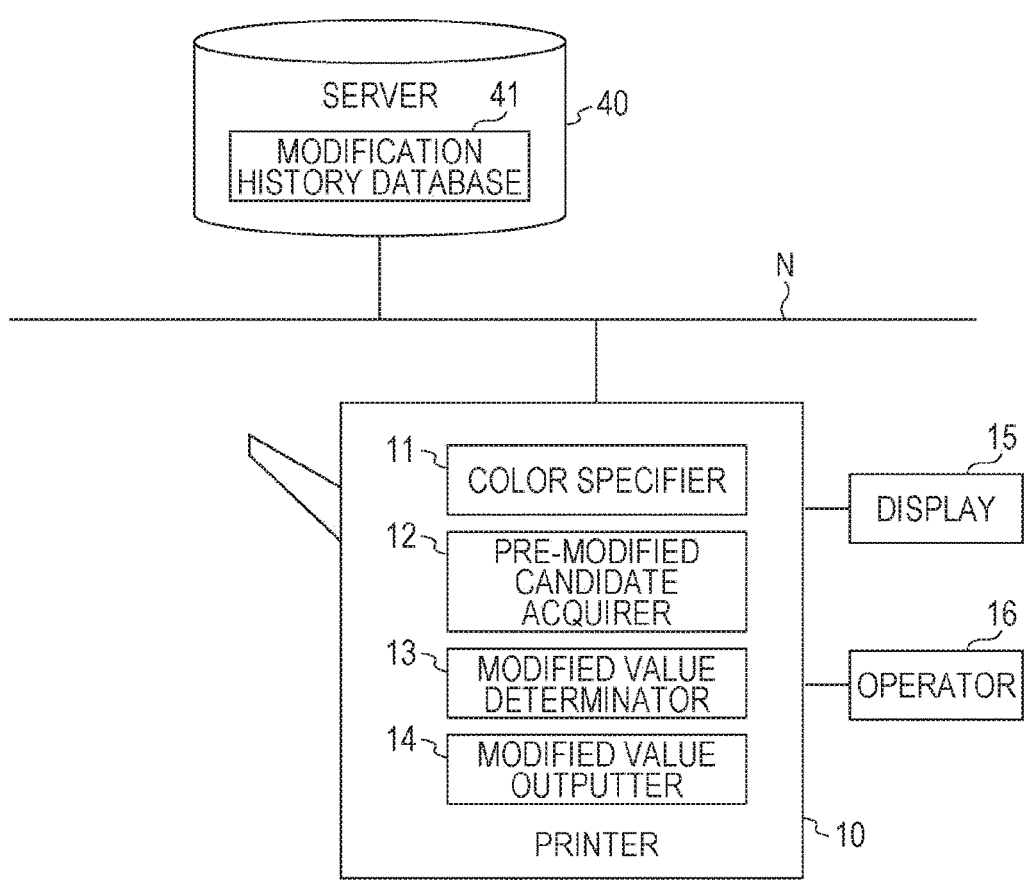
FIG. 2 is a configuration diagram illustrating another system configuration example (Example 2) common to each embodiment of the present invention.

The example illustrated in FIG. 2 is an image forming system including the printer 10 and a server 40. The printer 10 and the server 40 are connected in such a manner that data can be transferred through the predetermined network N.

In the example in FIG. 2, the printer 10 includes a color specifier 11, a pre-modified candidate acquirer 12, a modified value determinator 13, and a modified value outputter 14. The color specifier 11, the pre-modified candidate acquirer 12, the modified value determinator 13, and the modified value outputter 14 include hardware. Alternatively, software may be included by installing, in the printer 10, an application program similar to the application program 30 installed in the computer device 20 illustrated in FIG. 1.

The processing performed by the color specifier 11, the pre-modified candidate acquirer 12, the modified value determinator 13, and the modified value outputter 14 is the same as that performed by the color specifier 31, the pre-modified candidate acquirer 32, the modified value determinator 34, and the modified value outputter 35 illustrated in FIG. 1, and the descriptions thereof will be omitted.

The printer 10 illustrated in FIG. 2 includes a display 15 and an operator 16, and a user can perform color adjustment using the operator 16 while checking display on the display 15.

The server 40 stores the modification history database 41 on the basis of the calculated value and the modified value obtained from the printer 10. The modification history database 41 stores, similar to the modification history database 33 of the computer device 20, modification history data indicating a correspondence between the calculated value and the modified value. Further, the modified value determinator 13 of the printer 10 refers to the modification history database 41 of the server 40 and determines the modified value.

Figure 3:
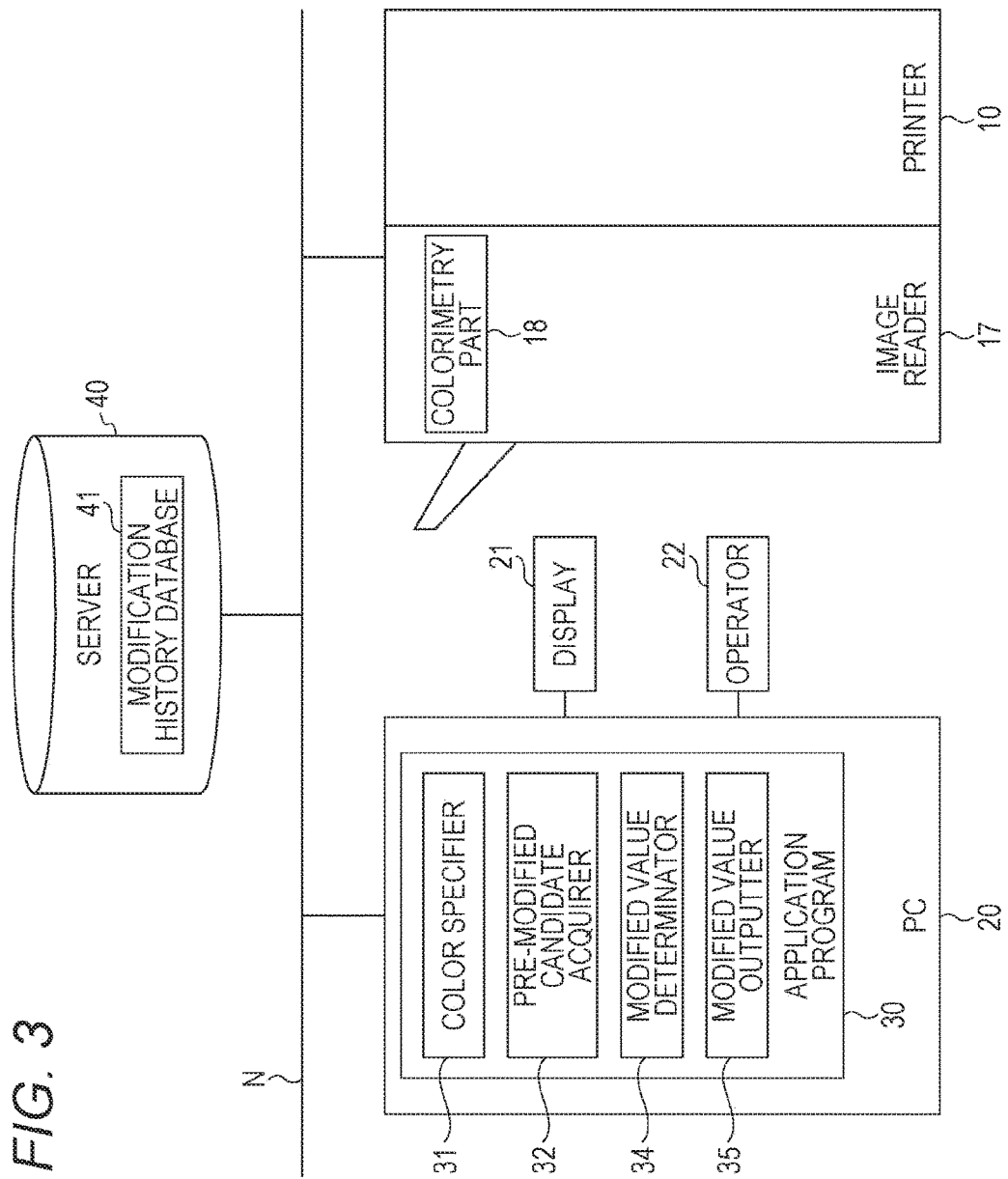
FIG. 3 is a configuration diagram illustrating another system configuration example (Example 3) common to each embodiment of the present invention.

The example illustrated in FIG. 3 is an image forming system including the printer 10, the computer device 20, and the server 40. The printer 10, the computer device 20, and the server 40 are connected in such a manner that data can be transferred through the predetermined network N.

An image reader 17 including a colorimetry part 18 is coupled to the printer 10, and a color of an entire image formed on a paper sheet printed by the printer 10 is measured by the colorimetry part 18.

The application program 30 is installed in the computer device 20 illustrated in FIG. 3, similar to the computer device 20 illustrated in FIG. 1. However, the computer device 20 in the example in FIG. 3 does not include the modification history database 33. The application program 30 executes color adjustment processing using the modification history database 41 stored in the server 40.

Note that the image reader 17 illustrated in FIG. 3 may be incorporated in the printer 10 illustrated in FIGS. 1 and 2. Besides, in the configuration in which the printer 10 includes the color specifier 11 as illustrated in FIG. 2, the printer 10 may independently perform all the processing by incorporating the modification history database 41 in the printer 10.

2. First Embodiment

Next, a first embodiment of the present invention will be described with reference to FIGS. 4 to 6. Although any of the configurations illustrated in the examples in FIGS. 1 to 3 may be employed with regard to the system configuration to which the first embodiment is applied, a case where the example illustrated in FIG. 1 is applied will be described.

Figure 4:
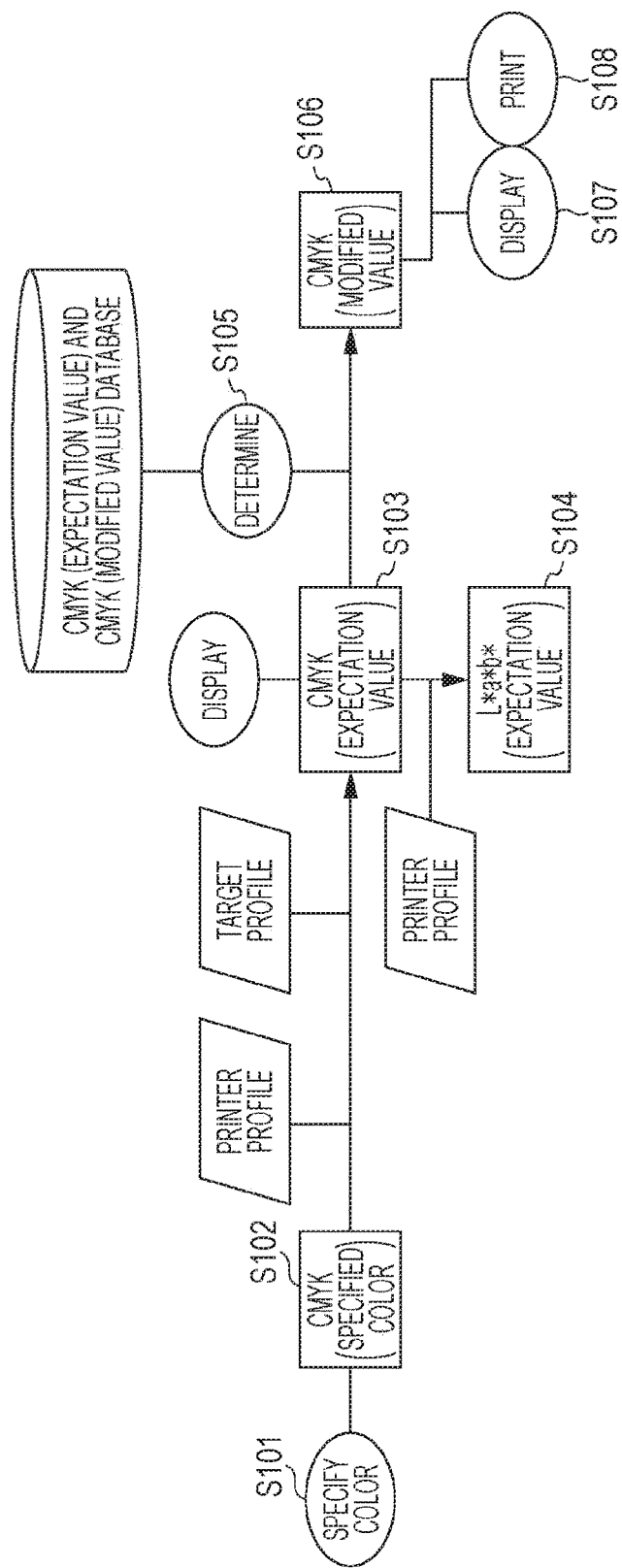
FIG. 4 is a diagram illustrating a flow of control according to a first embodiment of the present invention.

FIG. 4 is a diagram illustrating a flow of an entire color adjustment process according to the first embodiment.

First, a color is specified by a user operation on a computer device 20 configured as a color adjuster (step S101), and each component value of CMYK (cyan, magenta, yellow, and black) with respect to the specified color is obtained (step S102).

In a pre-modified candidate acquirer 32, each component value of CMYK is converted into, by a printer profile installed in the computer device 20, a component value of CMYK conforming to performance of a printer 10 that performs printing.

Further, in the pre-modified candidate acquirer 32, the component value of CMYK is converted into a value conforming to a standard by a target profile installed in the computer device 20, and a calculated value (expectation value) of each component of CMYK to which the profile is applied is obtained (step S103). The color based on the calculated value (expectation value) of each component of CMYK obtained in step S103 is displayed on a display 21 of the computer device 20.

Here, each component value of CMYK obtained in step S103 may be displayed on the display 21 as a color value of the L*a*b* color space that is a color space different from CMYK (step S104).

Then, a modified value determinator 34 performs, using data in a modification history database 33, processing for determining a modified value deemed appropriate from the calculated value (expectation value) of each component of CMYK obtained in step S103 (step S105). The modified value of each component of CMYK determined in step S105 is output from a modified value outputter 35 (step S106), and the color based on the modified value is displayed on the display 21 (step S107). Further, an image in which the color is modified in accordance with the modified value output from the modified value outputter 35 is printed by the printer 10 (step S108).

Figure 5:
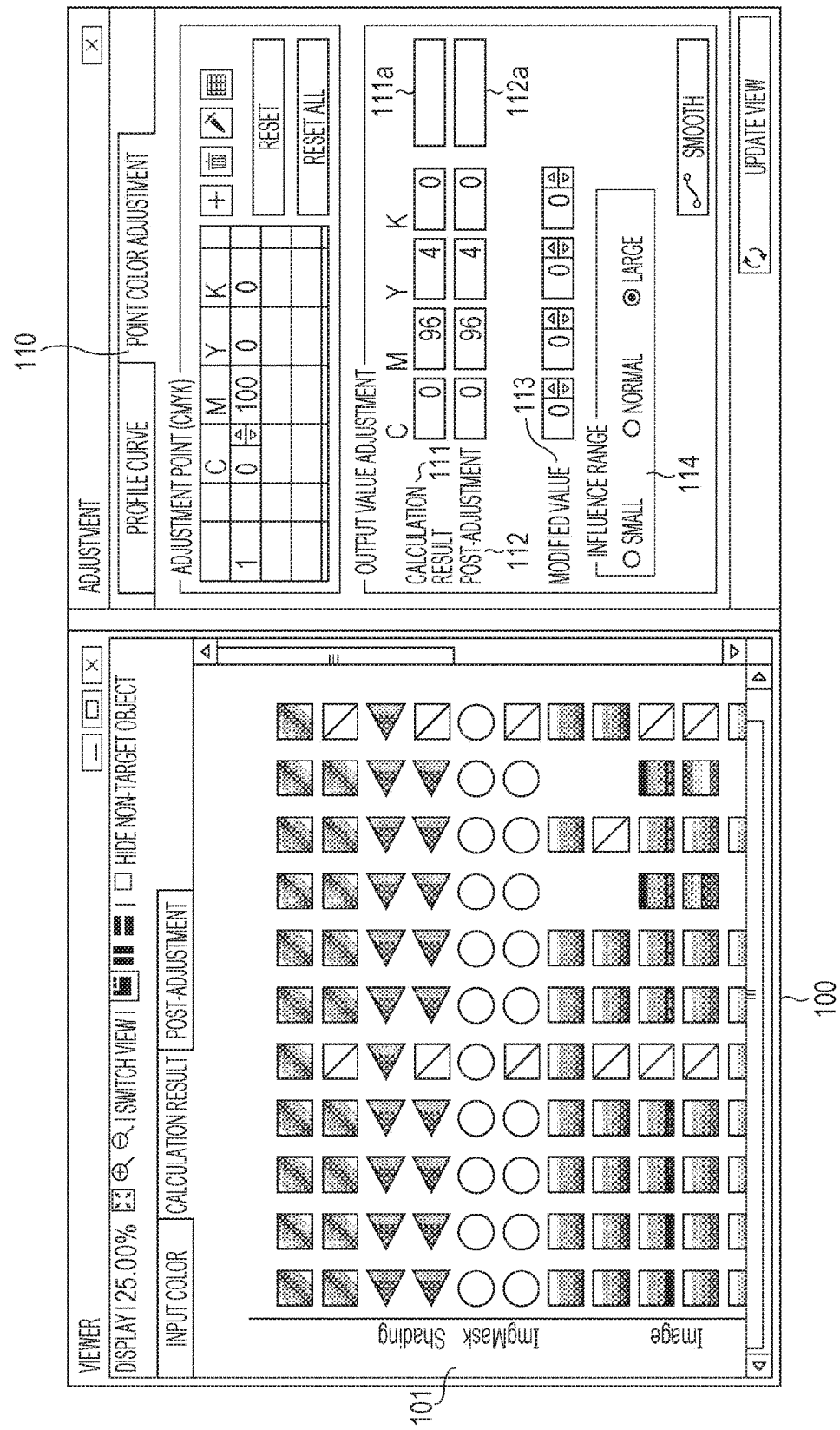
FIG. 5 is an explanatory diagram illustrating an exemplary control screen according to the first embodiment of the present invention.

FIG. 5 illustrates an exemplary screen displayed on the display 21 at the time of a color adjustment operation.

A display screen 100 illustrated in FIG. 5 includes a viewer area 101 and an adjustment value display area 110.

The image to be printed itself is preview-displayed in the viewer area 101 as a color image. As the image to be displayed in the viewer area 101, the image in the color calculated by the pre-modified candidate acquirer 32 is displayed. The color specification in step S101 is executed by, for example, performing an operation for specifying a specific portion by a user operation within the image displayed in the viewer area 101.

The viewer area 101 can be switched to display a modified image to which the color based on the modified value determined by the modified value determinator 34 is applied. Further, the viewer area 101 can also be switched to display an image before being subject to the calculation performed by the pre-modified candidate acquirer 32.

An adjustment state of a color output value is displayed in the adjustment value display area 110. More specifically, a calculated result display portion 111 in which a calculated result calculated by the pre-modified candidate acquirer 32 is displayed as a value for each color component of CMYK, a post-adjustment display portion 112 in which the modified value determined by the modified value determinator 34 is displayed as a value for each color component of CMYK, and a modified value display portion 113 for making a modification by a user operation are included. The calculated result display portion 111 and the post-adjustment display portion 112 include color display portions 111a and 112a, respectively, which display colors to which respective values are applied.

Further, the adjustment value display area 110 includes an influence range setting portion 114 that sets a range for applying the color adjustment, and the range for applying the color adjustment can be set by a user operation.

Figure 6:
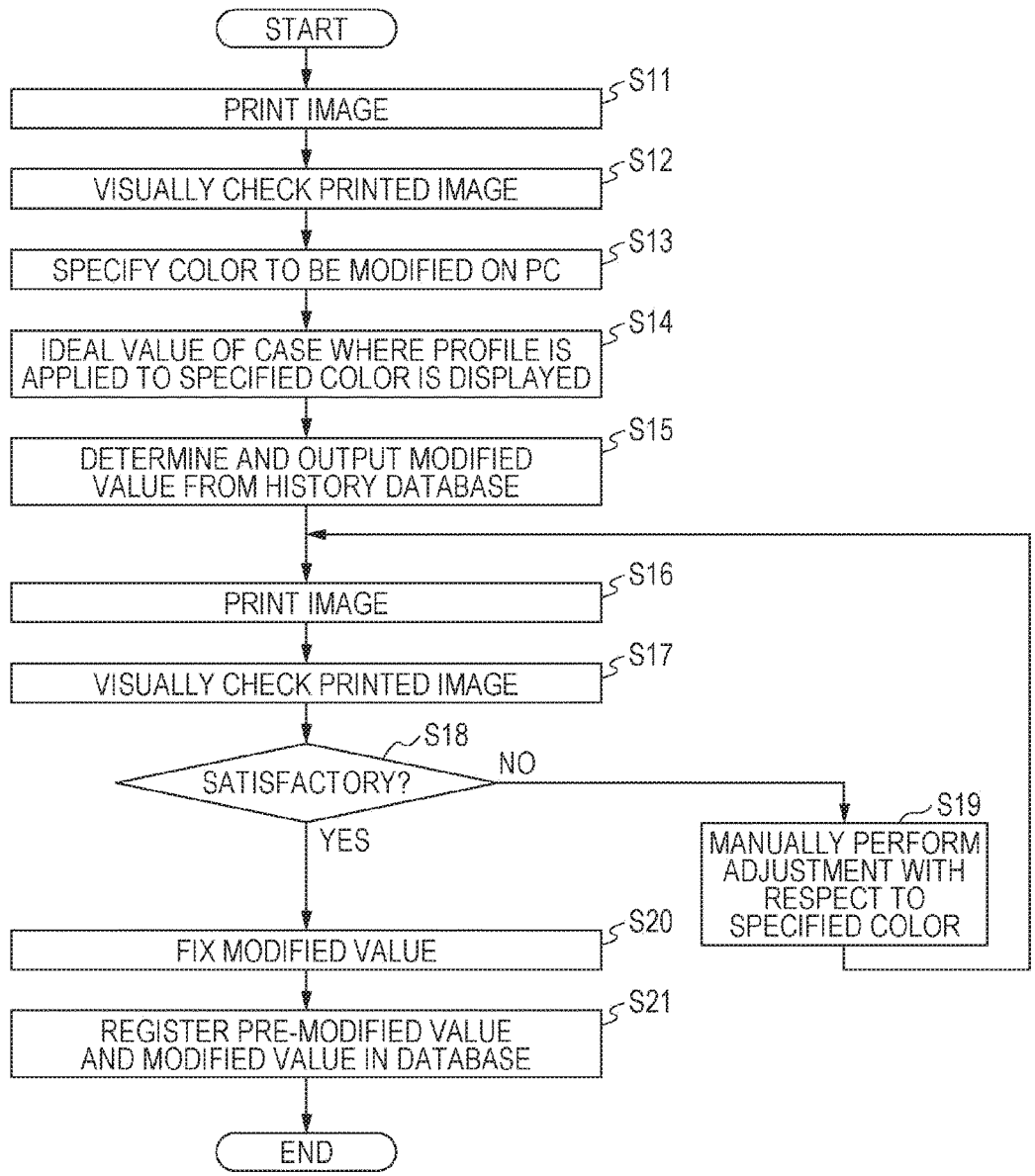
FIG. 6 is a flowchart illustrating a color adjustment process according to the first embodiment of the present invention.

FIG. 6 is a flowchart illustrating a detail of the color adjustment process according to the first embodiment.

First, a user prints an image by operating an operator 22 of the computer device 20 (step S11). The user visually checks the image printed in step S11 (step S12). Here, when there is a color to be modified within the checked image, the user specifies the color to be modified on a monitor screen of the display 21 on the computer device 20 (step S13).

When the user specifies the color to be modified in step S13, an ideal value (calculated value) of a case where a profile (printer profile and target profile) is applied to the specified color is calculated by the pre-modified candidate acquirer 32, and the calculated ideal value is displayed on the screen of the display 21 (step S14).

Further, the modified value determinator 34 of the computer device 20 determines, from the calculated value obtained in step S14, the modified value estimated to be optimum using the modification history database stored in the modification history database 33, and the determined modified value is output from the modified value outputter 35 (step S15).

When the modified value determinator 34 obtains the modified value using the modification history database, processing is performed in such a manner that a decision tree (prediction model) is obtained from among a plurality of modification histories by applying a machine learning algorithm called a random forest, and the modified value deemed appropriate is obtained from the calculated value on the basis of the decision tree, for example. Note that the use of the random forest in step S15 is merely an example. Further, when there is only one same (similar) modification history in the past, the modified value indicated by the past modification history is determined directly as the modified value deemed appropriate.

The user checks the color modification state from the display state on the display 21 in step S15, and performs an operation for printing the image having been subject to the corresponding color modification by the printer 10 (step S16). The user visually checks the printed image obtained by the printing operation (step S17), and determines whether the color adjustment state is satisfactory (step S18). When the color adjustment state is determined not to be satisfactory in step S18 (No in step S18), the user manually performs an adjustment with respect to the specified color by an operation using the operator 22 (step S19), and the process returns to the printing processing in step S16.

When the user determines that the color adjustment state is satisfactory in step S18 (Yes in step S18), the user performs an operation for fixing the current modified value (step S20). When the operation for fixing the modified value is performed, the modified value outputter 35 registers the current modified value and the pre-modified calculated value (ideal value obtained in step S14) in the modification history database (step S21), and the color adjustment process is terminated.

By applying the first embodiment described above, the modified value deemed appropriate is output using the past modification history stored in the modification history database when the user performs the color adjustment, whereby time and effort required for the color adjustment can be reduced. That is, even when an adjustment based on a user operation is necessary, a certain degree of the adjustment has been made in advance, whereby it is highly likely that the user can make the adjustment to the optimum modified value by performing only a slight adjustment, and the adjustment can be easily completed in a short time. Moreover, since the modified value based on the past modification history is output, a proper adjustment can be made easily even when the user does not have a skill in adjusting colors.

3. Second Embodiment

Next, a second embodiment of the present invention will be described with reference to FIGS. 7 and 8. A system configuration to which the second embodiment is applied will be described using a configuration in which a printer 10 includes an image reader 17 illustrated in the example in FIG. 3.

Figure 7:
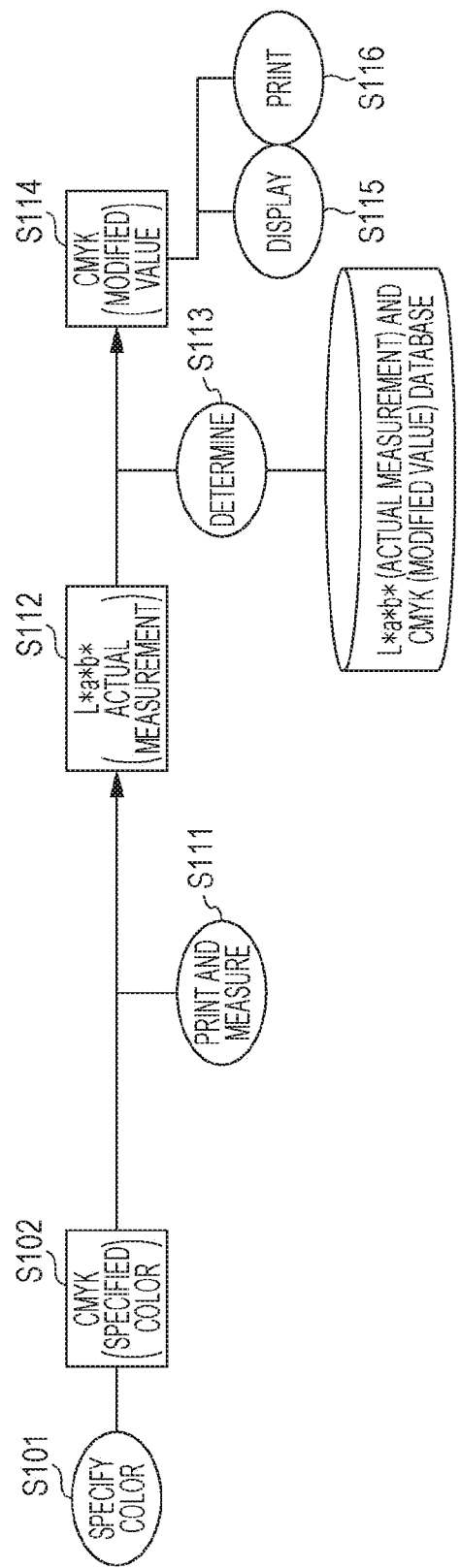
FIG. 7 is a diagram illustrating a flow of control according to a second embodiment of the present invention.

FIG. 7 is a diagram illustrating a flow of an entire color adjustment process according to the second embodiment.

First, a color is specified by a user operation on a computer device 20 configured as a color adjuster (step S101), and each component value of CMYK (cyan, magenta, yellow, and black) with respect to the specified color is obtained (step S102). Then, a printer 10 prints an image, and a colorimetry part 18 of the image reader 17 measures a color of the printed image (step S111). Here, the image reader 17 reads the entire image, and the colorimetry part 18 measures a portion of the color specified by the user operation in step S101.

Subsequently, a pre-modified candidate acquirer 32 of the computer device 20 reads the color value measured by the colorimetry part 18 (step S112). The actual measured color value is obtained as, for example, a color value of the L*a*b* color space. The color measured by the colorimetry part 18 is displayed on a display 21.

A modified value determinator 34 performs, using a modification history stored as a modification history database 33, processing for determining a modified value deemed appropriate from the actual measured color value obtained in step S112 (step S113). Here, the actual measured color value obtained in step S112 is a pre-modified calculated value. The modified value determined by the modified value determinator 34 is obtained as, for example, each component value of CMYK.

The modified value of each component of CMYK determined in step S113 is output from a modified value outputter 35 (step S114), and the color based on the modified value is displayed on the display 21 (step S115). Further, an image in which the color is modified in accordance with the modified value output from the modified value outputter 35 is printed by the printer 10 (step S116).

Figure 8:
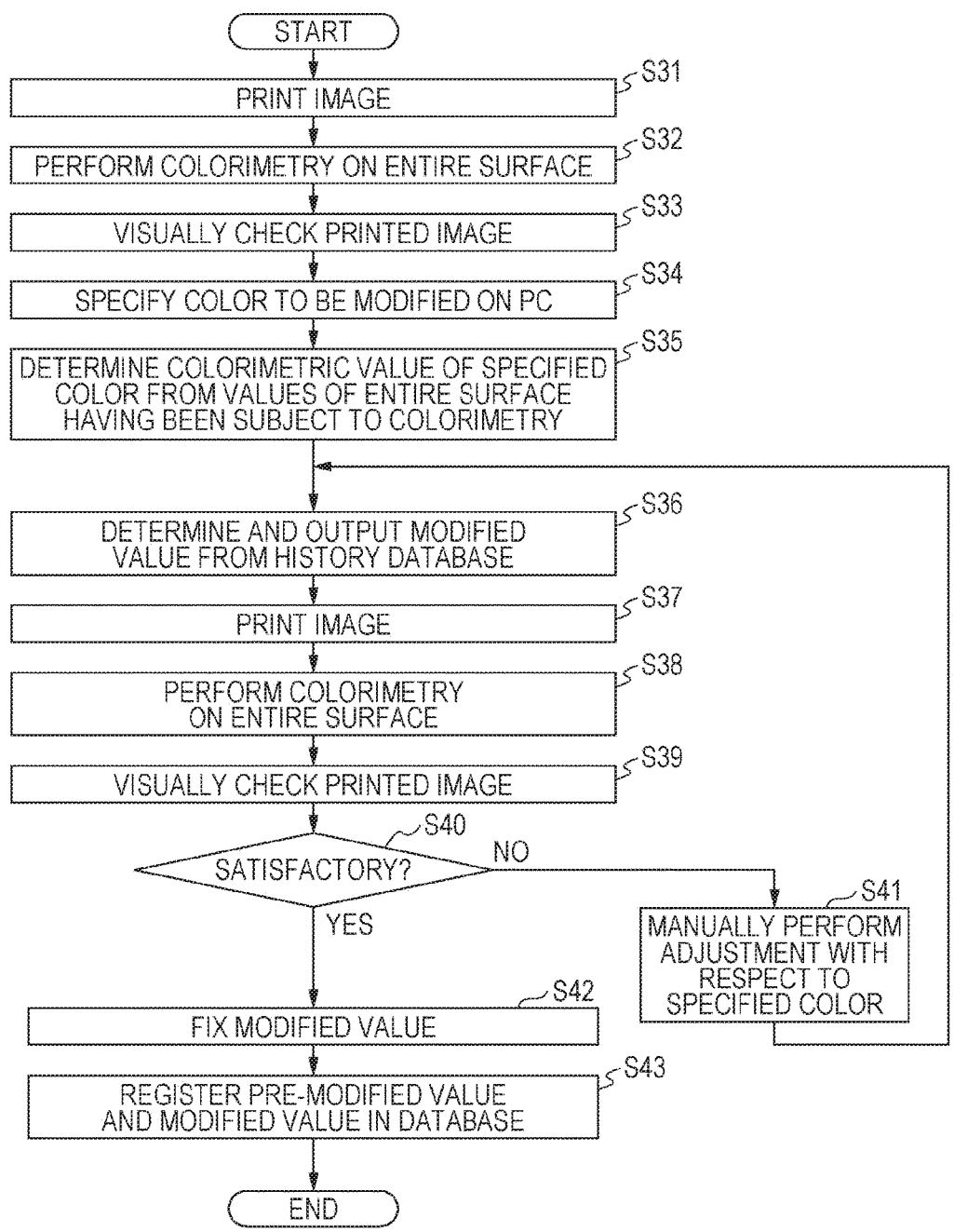
FIG. 8 is a flowchart illustrating a color adjustment process according to the second embodiment of the present invention.

FIG. 8 is a flowchart illustrating a detail of the color adjustment process according to the second embodiment.

First, a user prints an image by operating an operator 22 of the computer device 20 (step S31). At the time of the printing, the colorimetry part 18 of the image reader 17 measures colors of an entire surface of the printed image (step S32).

Then, the user visually checks the image printed in step S31 (step S33). Here, when there is a color to be modified within the checked image, the user specifies the color to be modified on a monitor screen of the display 21 on the computer device 20 (step S34).

When the user specifies the color in step S34, a colorimetric value of the specified portion is determined from among the values of the entire surface having been subject to the colorimetry in step S32 (step S35). Here, for example, a preview image of the image to be printed is aligned with the image in which the entire surface has been subject to the colorimetry, thereby determining a position at which the colorimetric value is obtained.

Subsequently, the modified value determinator 34 of the computer device 20 determines, from the colorimetric value obtained in step S35, the modified value estimated to be optimum using data in the modification history database 33, and the determined modified value is output from the modified value outputter 35 (step S36). When the modified value determinator 34 obtains the modified value using the modification history database, a machine learning algorithm is applied in the same manner as in the first embodiment.

The user checks the color modification state in step S36 from the display state on the display 21, and prints the image having been subject to the corresponding color modification by the printer 10 (step S37). The entire surface of the printed image at this time is subject to the colorimetry by the colorimetry part 18 of the image reader 17 (step S38).

The user visually checks the printed image obtained in step S37 (step S39), and determines whether the color adjustment state is satisfactory (step S40). When the color adjustment state is determined not to be satisfactory in step S40 (No in step S40), the user manually performs an adjustment with respect to the specified color by an operation using the operator 22 (step S41), and the process returns to the processing for determining the modified value in step S36. In the processing for determining the modified value in step S36, the modified value having been corrected to the extent adjusted by the user operation is determined.

When the user determines that the color adjustment state is satisfactory in step S40 (Yes in step S40), the user performs an operation for fixing the current modified value (step S42). When the operation for fixing the modified value is performed, the modified value outputter 35 registers the current modified value and the pre-modified calculated value (colorimetric value obtained in step S35) in the modification history database (step S43), and the color adjustment process is terminated.

By applying the second embodiment descried above, in the similar manner to the first embodiment, time and effort required for the color adjustment can be reduced, and a proper adjustment can be made easily even when the user does not have a skill in adjusting colors. Moreover, according to the second embodiment, the printed image is modified using the actual measured color, whereby an effect that accuracy of the color adjustment is improved is also exerted.

4. Third Embodiment

Next, a third embodiment of the present invention will be described with reference to FIGS. 9 and 10. The example in FIG. 1 is applied to the third embodiment. The third embodiment of the present invention is a combination of the process described in the first embodiment in which the calculated value of the specified color is obtained by applying the profile and a modified value is obtained from the calculated value by referring to the database and the process described in the second embodiment in which the modified value is obtained from the actual measured value of the printed image by referring to the database.

Figure 9:
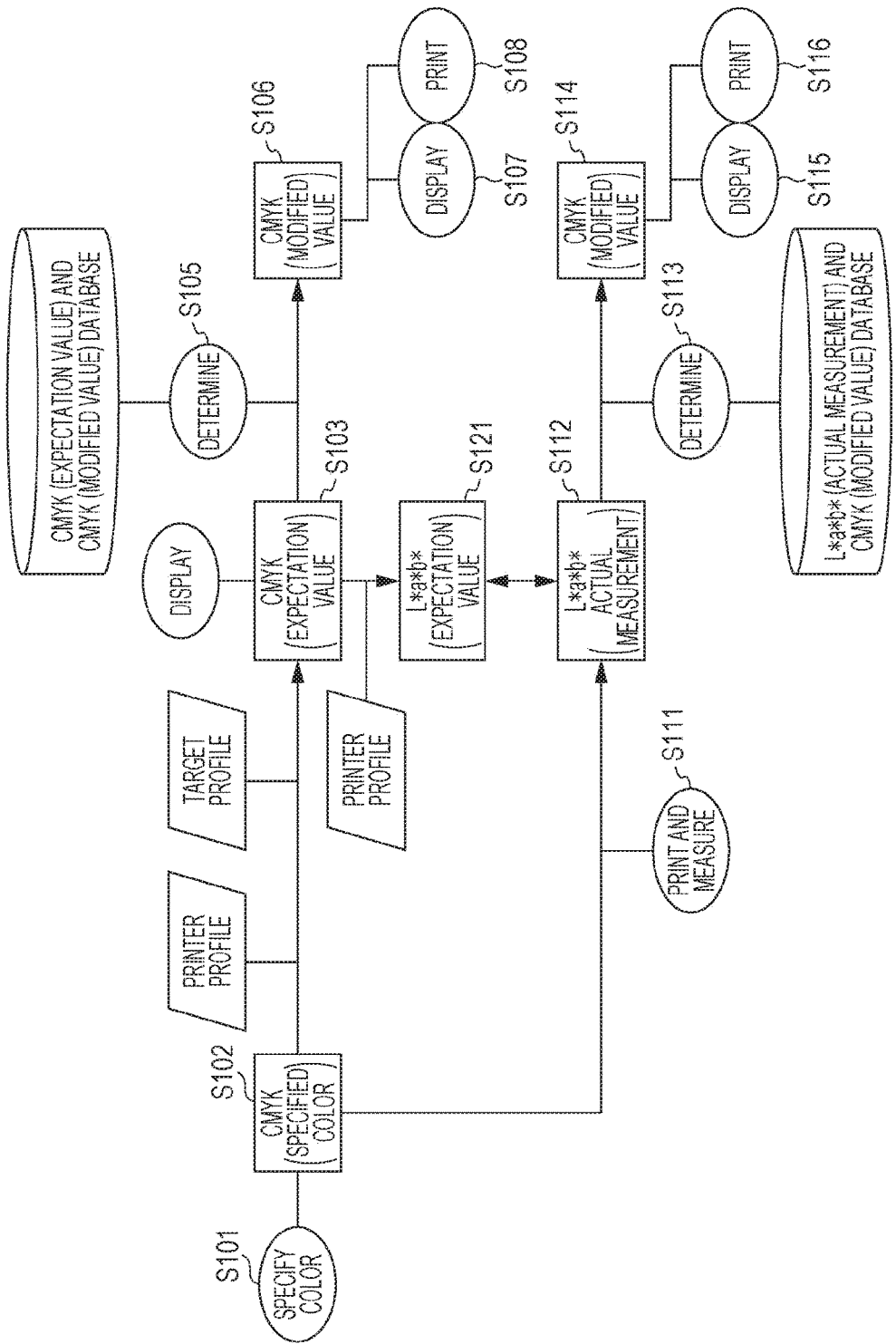
FIG. 9 is a diagram illustrating a flow of control according to a third embodiment of the present invention.

FIG. 9 is a diagram illustrating a flow of an entire color adjustment process according to the third embodiment.

First, a color is specified by a user operation on a computer device 20 configured as a color adjuster (step S101), and each component value of CMYK (cyan, magenta, yellow, and black) with respect to the specified color is obtained (step S102). Each component value of CMYK described above is converted into a calculated value (expectation value) of each component of CMYK to which a printer profile and a target profile are applied by a pre-modified candidate acquirer 32 (step S103).

The color based on the calculated value (expectation value) of each component of CMYK obtained in step S103 is displayed on a display 21 of the computer device 20. Besides, each component value of CMYK obtained in step S103 is converted into a color value of the L*a*b* color space.

Then, a modified value determinator 34 performs processing for determining a modified value deemed appropriate using the calculated value (expectation value) of each component of CMYK obtained in step S103 and data in a modification history database 33 (step S105). The modified value of each component of CMYK determined in step S105 is output from a modified value outputter 35 (step S106), and the color based on the modified value is displayed on the display 21 (step S107). Further, an image in which the color is modified in accordance with the modified value output from the modified value outputter 35 is printed by a printer 10 (step S108).

Moreover, in the third embodiment, when the color is specified by the user operation in step S101, an image based on each component value obtained in step S102 is printed by the printer 10, and the color of the printed image is measured by a colorimetry part 18 of an image reader 17 (step S111).

Subsequently, the pre-modified candidate acquirer 32 of the computer device 20 reads the color value measured by the colorimetry part 18 as the color value of the L*a*b* color space (step S112). Here, the pre-modified candidate acquirer 32 compares the color value of the L*a*b* color space obtained in step S103 with the color value of the L*a*b* color space obtained by the colorimetry in step S112 (step S121).

Then, the pre-modified candidate acquirer 32 determines whether a difference between the colors is within a threshold value as a result of the comparison in step S121, and when the difference is within the threshold value, the modified value is determined through the processing in steps S105 and S106 using the history database described in the first embodiment.

Alternatively, when the difference between the colors is within the threshold value as a result of the comparison in step S121, the modified value is determined through the processing in steps S112 and S113 using the history database described in the second embodiment.

Further, when the difference between the colors exceeds the threshold value as a result of the comparison in step S121, a printer adjustment (machine adjustment) is executed since the adjustment of the printer 10 may not be appropriate. The printer adjustment may be performed by an operation of the user checking the display on the display 21.

Figure 10:
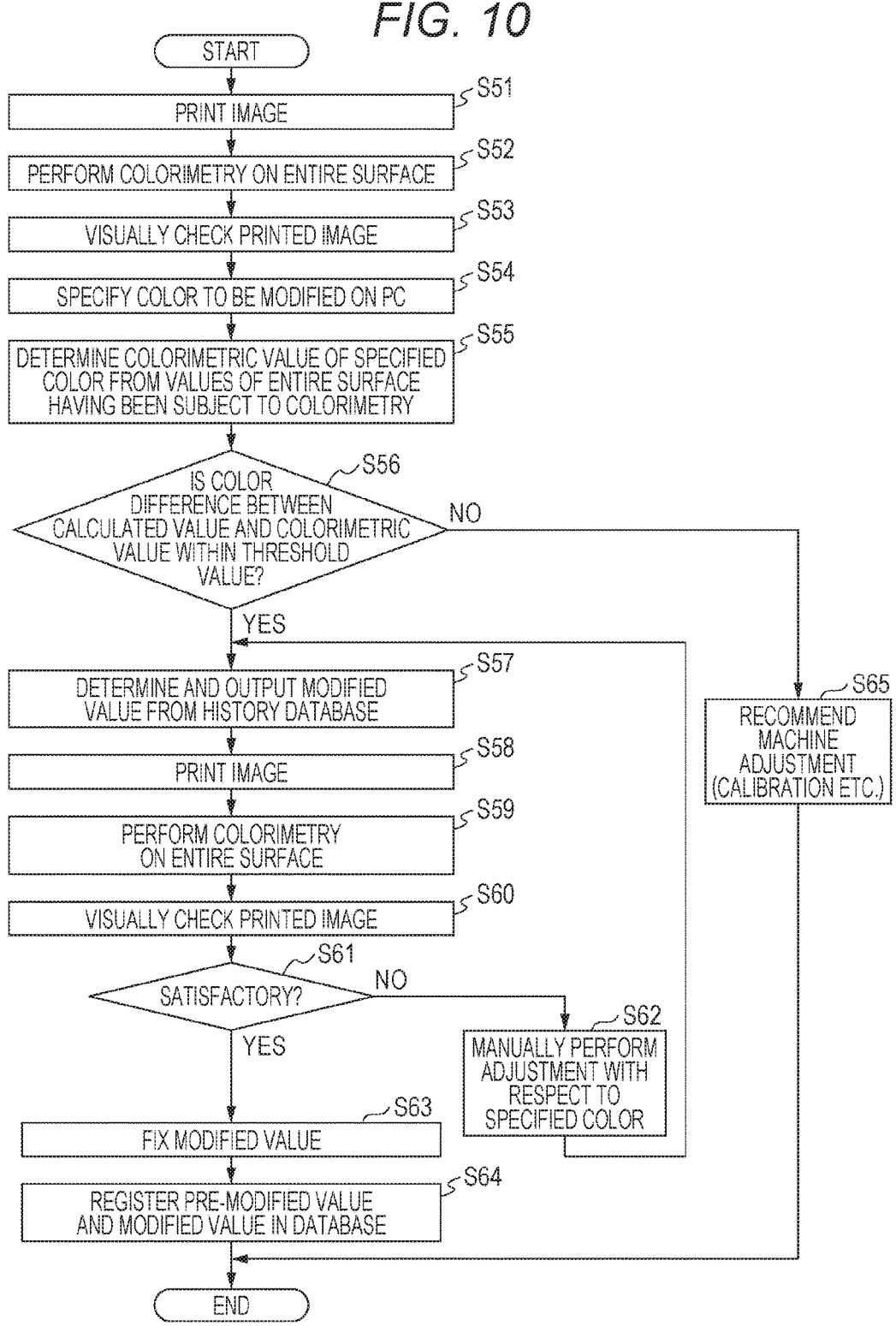
FIG. 10 is a flowchart illustrating a color adjustment process according to the third embodiment of the present invention.

FIG. 10 is a flowchart illustrating a detail of the color adjustment process according to the third embodiment.

First, the user prints an image by operating the operator 22 of the computer device 20 (step S51). At the time of the printing, the colorimetry part 18 of the image reader 17 measures colors of an entire surface of the printed image (step S52).

Then, the user visually checks the image printed in step S51 (step S53). Here, when there is a color to be modified within the checked image, the user specifies the color to be modified on a monitor screen of the display 21 on the computer device 20 (step S54).

When the user specifies the color to be modified in step S34, a colorimetric value of the specified portion is determined from among the values of the entire surface having been subject to the colorimetry in step S32 (step S55). At this time, the pre-modified candidate acquirer 32 also calculates an ideal value (calculated value) of a case where the profile (printer profile and target profile) is applied to the specified color.

Subsequently, the pre-modified candidate acquirer 32 compares the calculated value to which the profile is applied with the colorimetric value obtained by the colorimetry part 18, and determines whether a color difference is within a predetermined threshold value (step S56). Here, when the color difference exceeds the predetermined threshold value (No in step S56), a machine adjustment such as a calibration adjustment is executed (step S65) since the adjustment of the printer 10 may not be appropriate. The threshold value for the determination in step S56 is, for example, a value satisfying $\Delta F=5.0$ with respect to the color value of the L*a*b* color space, and the machine adjustment is executed when the threshold value 5.0 is exceeded. The equation $\Delta E=5.0$ is an example, and another value may be set as a threshold value.

When the color difference is determined to be within the predetermined threshold value in step S56 (Yes in step S56), the modified value determinator 34 of the computer device 20 determines a modified value deemed estimated to be optimum from the colorimetric value and the calculated value obtained in step S55 using data stored in the modification history database 33. Then, the determined modified value is output from the modified value outputter 35 (step S57). When the modified value determinator 34 obtains the modified value using the modification history database 33, a machine learning algorithm is applied in the same manner as in the first and second embodiments.

The user checks the color modification state from the display state on the display 21 in step S36, and prints the image having been subject to the color modification by the printer 10 (step S58). The entire surface of the printed image at this time is subject to the colorimetry by the colorimetry part 18 of the image reader 17 (step S59).

The user visually checks the printed image obtained in step S37 (step S60), and determines whether the color adjustment state is satisfactory (step S61). When the color adjustment state is determined not to be satisfactory in step S61 (No in step S61), the user manually performs an adjustment with respect to the specified color by operating the operator 22 (step S62), and the process returns to the processing for determining the modified value in step S57. In the processing for determining the modified value in step S57, the modified value having been corrected to the extent adjusted by the user operation is determined.

When the user determines that the color adjustment state is satisfactory in step S61 (Yes in step S61), the user performs an operation for fixing the current modified value (step S63). When the operation for fixing the modified value is performed, the modified value outputter 35 registers the current modified value and the pre-modified calculated value (or colorimetric value) in the modification history database (step S64), and the color adjustment process is terminated.

By applying the third embodiment described above, the ideal value and the actual measured value are compared with each other, and the case where the machine adjustment of the printer 10 is inappropriate can be detected. When the ideal value and the actual measured value are not compared with each other in such a situation where the machine adjustment is inappropriate, it is not preferable to perform unreasonable color adjustment processing. However, according to the third embodiment, it can be properly determined whether the machine adjustment is necessary, whereby the color adjustment processing can be performed in a short time as a result.

5. Variation

In each embodiment described above, a color to be modified is determined on the basis of a user operation. Meanwhile, for example, from among colorimetric values included in a result obtained by a colorimetry with respect to an entire image performed by a colorimetry part 18 of an image reader 17 illustrated in FIG. 3, a colorimetric value of a color in which a frequency or the number of times of being subject to a modification is large may be determined by a computer device 20 using past modification histories stored in a modification history database 33 (or 41). In other words, the computer device 20 determines the colorimetric value of the color highly likely to be modified. Then, a candidate for the color highly likely to be modified, which has been determined by the computer device 20, is displayed on a display 21 as a list of recommended modified values. A user checking the display inputs necessity of the modification with an operator 22.

Figure 11:
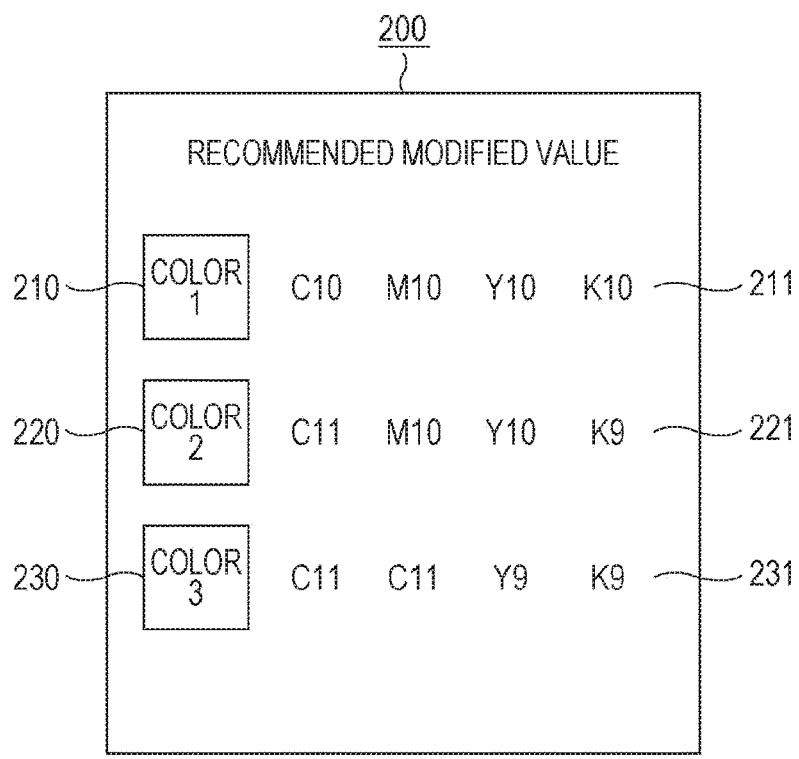
FIG. 11 is an explanatory diagram illustrating a variation (example of displaying a candidate for a modified value) of each embodiment of the present invention.

FIG. 11 illustrates an example of a display screen 200 of the display 21 in this case.

Three candidate colors 210, 220, and 230 are displayed on the display screen 200 as recommended modified values, and adjustment values 211, 221, and 231 of components of CMYK with respect to each candidate color are individually displayed. The adjustment values 211, 221, and 231 are values obtained from the past modification histories stored in the modification history database 33 (or 41).

When performing the displayed adjustment with respect to the candidate colors 210, 220, and 230 on the display screen 200, the user selects a portion of the candidate color to be adjusted from among the candidate colors 210, 220, and 230. When determining that the candidate color is selected, the computer device 20 causes a modified value determinator 34 to execute the corresponding modification.

As illustrated in FIG. 11, a candidate for a modified color is displayed from the past modification histories, whereby time and effort required for the user to select a color to be modified can be reduced.

In each embodiment described above, one modification history database is prepared as the modification history database 33 (or 41), and the modified value is obtained by constantly referring to the one modification history database.

Meanwhile, when a modification history is registered in the modification history database 33 (or 41), attribute information may be added to the modification history, and the modified value determinator 34 may determine the modified value on the basis of past modified values for each classification indicated by the attribute information.

Figure 12:
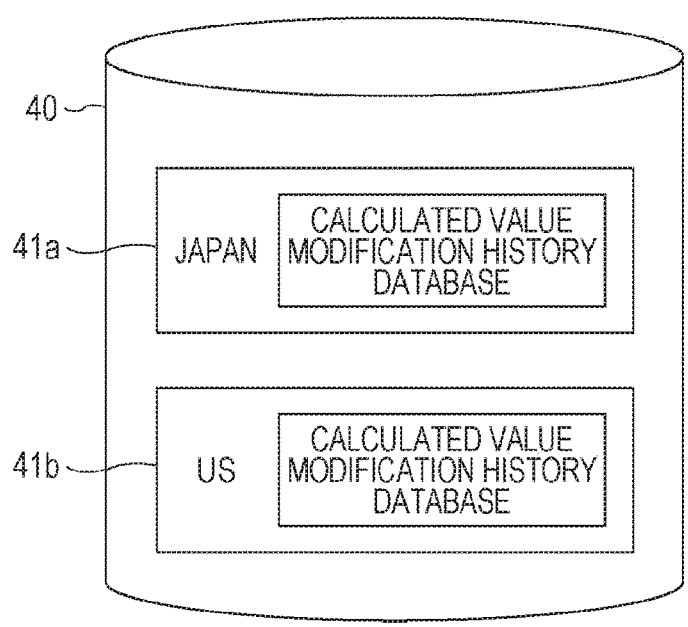
FIG. 12 is a configuration diagram illustrating another variation (example of providing a modification history in a server in each area) of each embodiment of the present invention.
Figure 13:
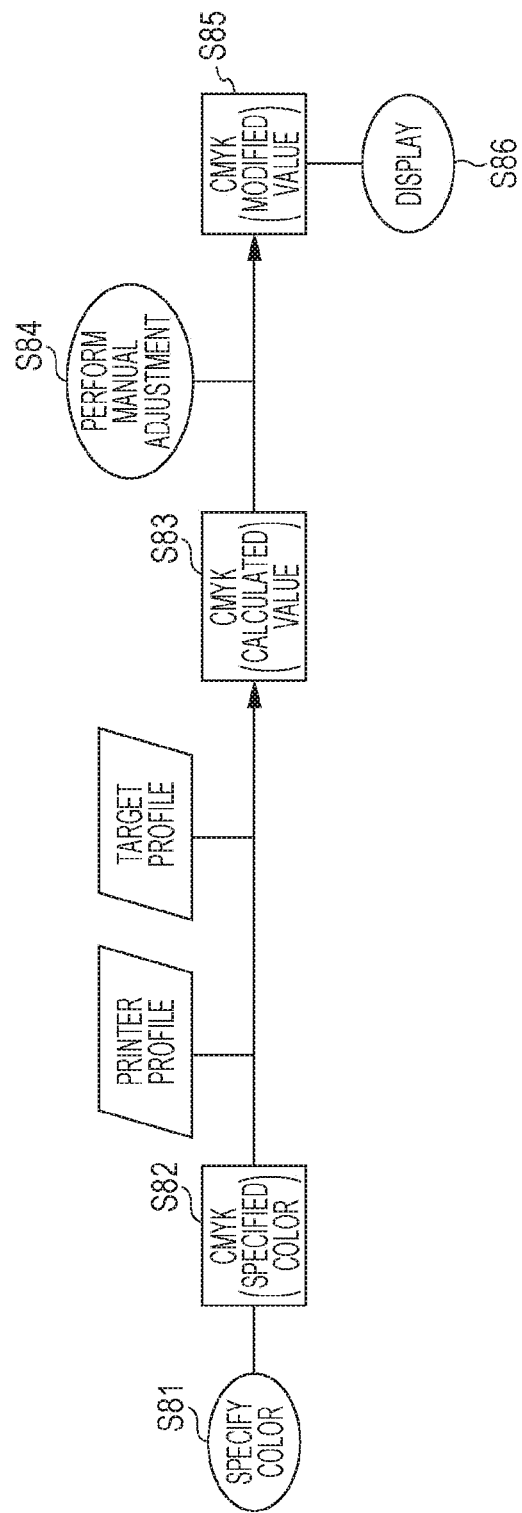
FIG. 13 is a diagram illustrating a flow of control at the time of conventional color adjustment.
Figure 14:
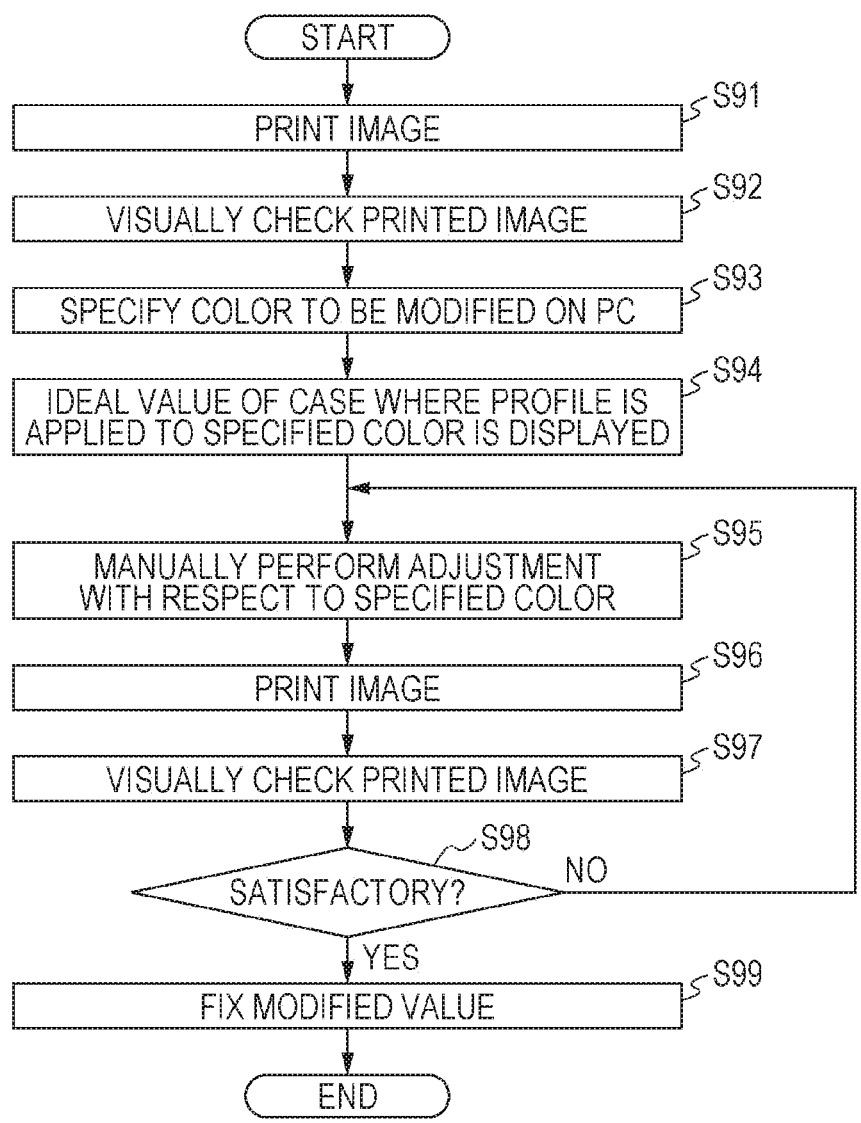
FIG. 14 is a flowchart illustrating a conventional color adjustment process.

FIG. 12 illustrates an example of a database configuration included in a server 40.

In the example in FIG. 12, as a database, a modification history database 41a for Japan and a modification history database 41b for the United States are provided. In each database 41a and 41b, a modification history in a printer installed in each country (area) is registered. Then, when a command for reading a past modification history is made from a control device of the printer installed in each country (area), the server 40 reads a past modified value from the database 41a or 41b of the corresponding country and transmits the modified value to the control device side.

The attribute information divided for each country or area as illustrated in FIG. 12 is an example, and the attribute information may be classified by adding the attribute information in other classifications.

For example, the modification history may be registered in the modification history database 33 (or 41) by adding at least one of the attribute information selected from a country, area, and company in which the printer is installed, a user classification, time, a period, a printer model, a paper sheet, a print setting, and a print job type.

In this manner, the past modification history is registered using the attribute information, and the corresponding past modification history is referred to, whereby accuracy for determining the modified value can be improved.

Although embodiments of the present invention have been described and illustrated in detail, the disclosed embodiments are made for purposes of illustration and example only and not limitation. The scope of the present invention should be interpreted by terms of the appended claims.

What is claimed is:

1. A color adjuster comprising:
 a processor; and
 a storage part communicatively coupled to the processor, the storage part comprising instructions that, when executed by the processor, cause the color adjuster to, at least, execute:
 a color specifier function that specifies a color when an image former forms an image;
 a pre-modified candidate acquirer function that obtains a calculated value to which a profile for forming an image is applied or a colorimetric value of an image forming result with respect to the color specified by the color specifier;
 a modification history database that stores the calculated value or the colorimetric value obtained by the pre-modified candidate acquirer, the calculated value and the colorimetric value being associated with a past modified value;
 a modified value determinator function that determines a modified value of the calculated value or the colorimetric value obtained by the pre-modified candidate acquirer on the basis of the past modified value stored in the modification history database, and, upon a determination that a color adjustment state is not satisfactory, user input indicating a manual adjustment with respect to the specified color; and
 a modified value outputter function that displays or outputs the modified value determined by the modified value determinator.

2. The color adjuster according to claim 1, wherein the color specifier specifies a color of a specific portion of an image displayed on a display, the specific portion being specified by a user operation.

3. The color adjuster according to claim 1, wherein when the modified value determinator fixes the modified value, the modified value fixed by the modified value determinator is stored in the modification history database.

4. The color adjuster according to claim 1, wherein the modified value outputter displays or prints an image based on the modified value determined by the modified value determinator.

5. The color adjuster according to claim 1, wherein the modification history database includes attribute information regarding a modification history, and the modified value determinator determines the modified value from a past modified value for each classification indicated by the attribute information.

6. The color adjuster according to claim 1, wherein the calculated value to which the profile for forming an image is applied obtained by the pre-modified candidate acquirer is compared with the colorimetric value of the image forming result, and when a color difference exceeds a threshold value as a result of the comparison, an adjustment of the image former is executed.

7. The color adjuster according to claim 1, wherein a color to be modified is determined on the basis of the colorimetric value, and a candidate for a modified value with respect to the color highly likely to be modified is displayed after being obtained from data in the modification history database to be displayed.

8. A non-transitory recording medium storing a computer readable program causing a computer to perform:
 specifying a color when an image former forms an image;
 obtaining a pre-modified candidate for obtaining a calculated value to which a profile for forming an image is applied or a colorimetric value of an image forming result with respect to the color specified by the specifying of a color;
 obtaining a modification history database in which the calculated value calculated by the obtaining of a pre-modified candidate or the colorimetric value and a past modified value are associated;
 determining a modified value of the calculated value or the colorimetric value obtained by the obtaining of a pre-modified candidate on the basis of the past modified value stored in the modification history database and, upon a determination that a color adjustment state is not satisfactory, user input indicating a manual adjustment with respect to the specified color; and
 displaying or outputting the modified value determined by the determining of a modified value.

* * * * *